US011023606B2

(12) United States Patent
Murphy et al.

(10) Patent No.: US 11,023,606 B2
(45) Date of Patent: Jun. 1, 2021

(54) SYSTEMS AND METHODS FOR DYNAMICALLY APPLYING INFORMATION RIGHTS MANAGEMENT POLICIES TO DOCUMENTS

(71) Applicant: VMware, Inc., Palo Alto, CA (US)

(72) Inventors: Gerard Murphy, Lawrenceville, GA (US); Yugansh Arora, Atlanta, GA (US); Kunal Muchhala, Sandy Springs, GA (US); Gaurav Arora, Cumming, GA (US); Anthony Kueh, San Jose, CA (US); Deep Singh, Atlanta, GA (US)

(73) Assignee: VMware, Inc., Palo Alto, CA (US)

( * ) Notice: Subject to any disclaimer, the term of this patent is extended or adjusted under 35 U.S.C. 154(b) by 158 days.

(21) Appl. No.: 15/638,583

(22) Filed: Jun. 30, 2017

(65) Prior Publication Data

US 2018/0096158 A1 Apr. 5, 2018

Related U.S. Application Data

(60) Provisional application No. 62/403,191, filed on Oct. 2, 2016.

(51) Int. Cl.
*G06F 21/62* (2013.01)
*H04L 9/32* (2006.01)
*G06F 21/10* (2013.01)
*G06F 16/11* (2019.01)

(52) U.S. Cl.
CPC ........ *G06F 21/6218* (2013.01); *G06F 16/122* (2019.01); *G06F 21/10* (2013.01); *H04L 9/3213* (2013.01); *H04L 2209/60* (2013.01); *H04L 2209/76* (2013.01)

(58) Field of Classification Search
CPC .............. H04L 9/3213; H04L 2209/60; H04L 2209/76; G06F 21/10; G06F 21/6218; G06F 16/122
USPC .......................................................... 726/1
See application file for complete search history.

(56) References Cited

U.S. PATENT DOCUMENTS

| 9,280,773 | B1* | 3/2016 | Evans | G06Q 20/4014 |
| 9,519,399 | B1* | 12/2016 | Goodale | G06F 3/0482 |
| 2003/0046407 | A1* | 3/2003 | Erickson | G06F 21/10 |
| | | | | 709/229 |
| 2007/0067309 | A1* | 3/2007 | Klein, Jr. | H04L 65/10 |
| 2008/0235746 | A1* | 9/2008 | Peters | H04N 21/6168 |
| | | | | 725/111 |

(Continued)

Primary Examiner — Dereena T Cattungal
(74) Attorney, Agent, or Firm — Clayton, McKay & Bailey, PC

(57) ABSTRACT

Systems and methods are disclosed herein for dynamically applying information rights management ("IRM") policies to documents. An example system for dynamically applying IRM policies to documents can include a document repository, a proxy server, and a dynamic IRM wrapping service (also referred to herein as an IRM engine). A user can request a document on the document repository by, for example, attempting to access the document from a user device. The user device can be managed by a management server that enrolls the user device and enforces compliance rules and other policies at the user device. The user's request for the document can be received at the proxy server, and the proxy server can then request the document from the document repository.

17 Claims, 4 Drawing Sheets

(56) References Cited

U.S. PATENT DOCUMENTS

| | | | |
|---|---|---|---|
| 2009/0106156 A1* | 4/2009 | Choyi | G06F 21/10 |
| | | | 705/59 |
| 2009/0113536 A1* | 4/2009 | Zhang | G06F 21/10 |
| | | | 726/12 |
| 2009/0150866 A1* | 6/2009 | Schmidt | G06Q 50/18 |
| | | | 717/120 |
| 2009/0222919 A1* | 9/2009 | Liu | G06F 16/35 |
| | | | 726/22 |
| 2010/0043077 A1* | 2/2010 | Robert | G06F 21/10 |
| | | | 726/27 |
| 2010/0100924 A1* | 4/2010 | Hinton | G06F 21/10 |
| | | | 726/1 |
| 2010/0100925 A1* | 4/2010 | Hinton | G06F 21/10 |
| | | | 726/1 |
| 2011/0119361 A1* | 5/2011 | Issa | G06Q 30/02 |
| | | | 709/223 |
| 2011/0225417 A1* | 9/2011 | Maharajh | G06F 21/10 |
| | | | 713/150 |
| 2011/0255417 A1* | 10/2011 | Mohan | H04L 43/10 |
| | | | 370/241.1 |
| 2013/0124856 A1* | 5/2013 | Agrawal | H04L 63/10 |
| | | | 713/156 |
| 2013/0219176 A1* | 8/2013 | Akella | H04L 63/0815 |
| | | | 713/165 |
| 2015/0012383 A1* | 1/2015 | Touboul | G06Q 30/0609 |
| | | | 705/26.35 |
| 2015/0020153 A1* | 1/2015 | Jang | H04L 63/101 |
| | | | 726/1 |
| 2015/0347996 A1* | 12/2015 | Alsina | G06Q 20/29 |
| | | | 705/44 |
| 2017/0004291 A1* | 1/2017 | Pathak | G06F 21/10 |
| 2017/0124324 A1* | 5/2017 | Peleg | G06F 21/554 |

* cited by examiner

SYSTEMS AND METHODS FOR DYNAMICALLY APPLYING INFORMATION RIGHTS MANAGEMENT POLICIES TO DOCUMENTS

CROSS REFERENCE TO RELATED APPLICATION

This application claims priority to U.S. Provisional Patent Application No. 62/403,191, entitled "Systems and methods for dynamically applying information rights management policies to documents," filed Oct. 2, 2016, and hereby incorporated by reference in its entirety.

BACKGROUND

Today's enterprise mobility management ("EMM") systems allow mobile users to remotely access secure content, such as documents, from their user devices. Because these documents can contain confidential information, enterprises often encrypt the documents with some form of information rights management ("IRM") policies. IRM policies can control which users, if any, can view, edit, print, export, extract, or comment on the document. IRM can also be described as enterprise rights management, enterprise digital rights management, document rights management, or intelligent rights management. All of these variations are included in the definition of "IRM" as used herein.

In order for IRM to perform its intended function for a document, the document must be encrypted with IRM before a user receives the document. Additionally, the user's method of accessing the document must be compatible with the particular IRM format for that document. In other words, the client application used to access the document must be able to recognize and decode the IRM included with the document. These compatibility issues can lead to inefficiencies and other problems.

For example, if an enterprise attempts to use a custom IRM for their documents, the enterprise must restrict its users such that they can only access the documents from a particular application designed to be compatible with that custom IRM. This precludes users from accessing enterprise documents through a third-party application, such as MICROSOFT WORD or OUTLOOK, that does not support the custom IRM. On the other hand, if the enterprise wants to allow its users to access secure documents through a third-party application, then the documents have to include IRM for that application. In practice, this would require blanket IRM policies to be applied to all of the enterprise documents. For example, all documents saved to a "finance" folder could have a finance-IRM template applied. These blanket policies would necessarily fail to account for important factors such as the type of user requesting access, the actual content of the document, and any other relevant factors. Blanket IRM policies can also compromise efficiency and slow down employee productivity.

For at least these reasons, a need exists for systems and methods that dynamically apply IRM policies to documents in an intelligent manner, taking relevant context into account and providing an efficient but secure document-management system.

DESCRIPTION

Reference will now be made in detail to the present examples, including examples illustrated in the accompanying drawings. Wherever possible, the same reference numbers will be used throughout the drawings to refer to the same or like parts.

Systems and methods are disclosed herein for dynamically applying IRM policies to documents. An example system for dynamically applying IRM policies to documents can include a document repository, a proxy server, and a dynamic IRM wrapping service (also referred to herein as an IRM engine). A user can request a document on the document repository by, for example, attempting to access the document from a user device. The user device can be managed by a management server that enrolls the user device and enforces compliance rules and other policies at the user device. The user's request for the document can be received at the proxy server, and the proxy server can then request the document from the document repository.

Continuing the example, the document repository can send, or attempt to send, the document to the proxy server. The IRM engine can intercept the document retrieved by the proxy server, either before or after it reaches the proxy server. In either case, the IRM engine gains access to the document before the proxy server sends the requested document back to the user.

The IRM engine can apply one or more IRM policies to the document after intercepting the document. Applying an IRM policy can be based, at least in part, on contextual information associated with the request, such as information associated with the user, the user device, or the document itself. For example, the IRM policy can be based on an organizational group associated with the user, a compliance status of the user device, a geographic location of the user device at the time of the request, or the creator of the document. Applying IRM to a document can include placing specific restrictions or policies in the header of the file. When the user attempts to access the file, a rights management service ("RMS") can enforce the restrictions or policies provided in the header of the file. The IRM policy can be applied by wrapping the document using a software development kit ("SDK") compatible with one or more third party IRM engines. The IRM policy can then be enforced by one of those third parties.

The IRM engine can operate according to various types of policies and information provided by a management server. The management server can perform EMM functions relevant to the systems disclosed herein, such as enrollment and compliance. The management server and related EMM functions are discussed with respect to FIG. 1.

Figure 2:
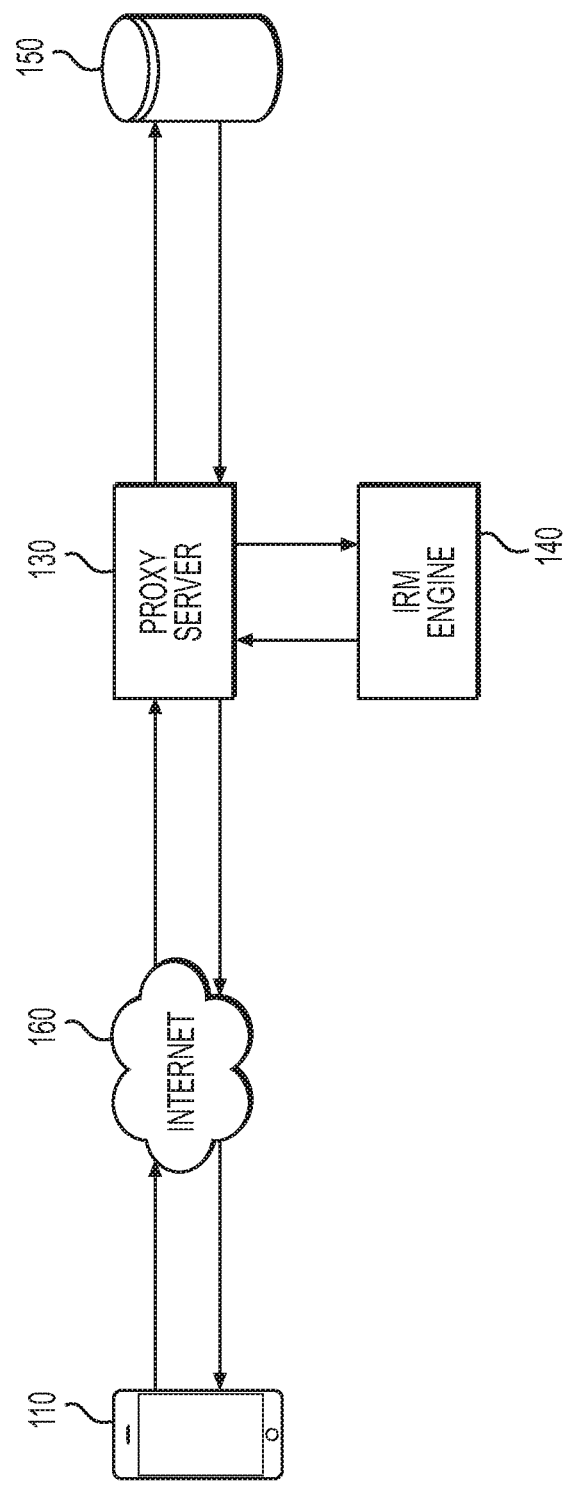
FIG. 2 is another illustration of example system components for dynamically applying information rights management policies to documents.
Figure 3:
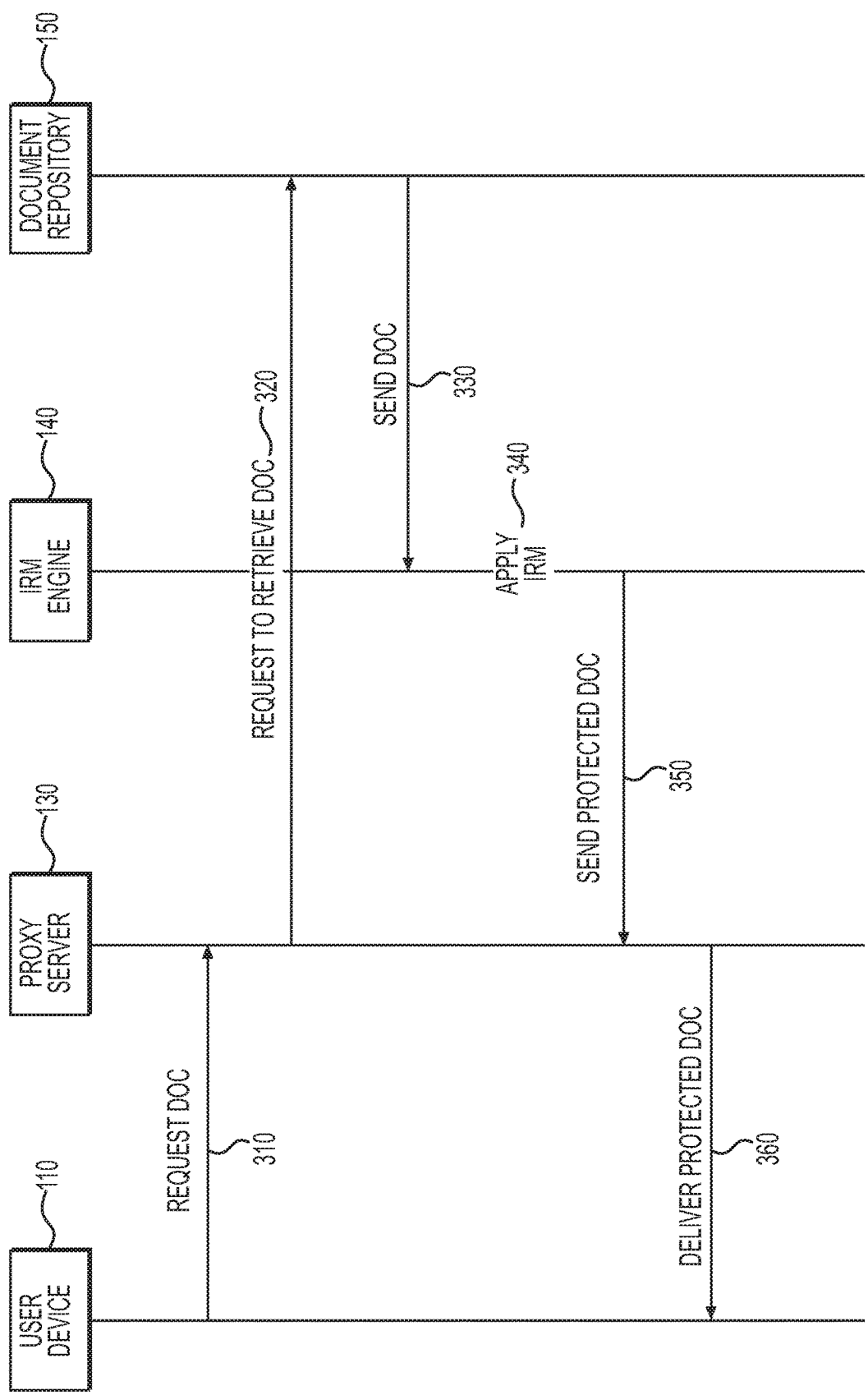
FIG. 3 is a sequence diagram of an example method for dynamically applying information rights management policies to documents.
Figure 4:
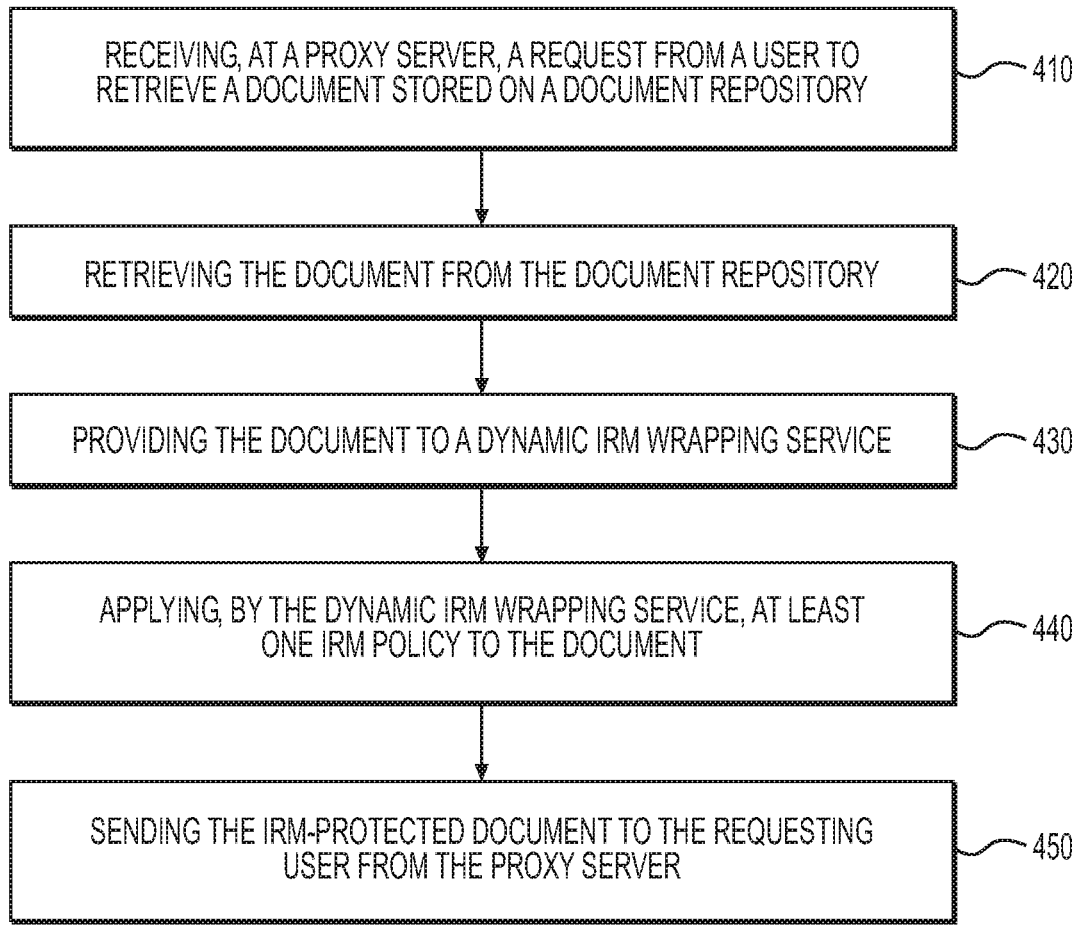
FIG. 4 is a flowchart of an example method for dynamically applying information rights management policies to documents.

FIG. 2 provides an illustration of example system components for dynamically applying IRM policies to documents. FIG. 3 provides a flowchart for an example system that dynamically applies IRM policies to documents. Finally, FIG. 4 is a flowchart for a method of dynamically applying IRM policies to documents.

Figure 1:
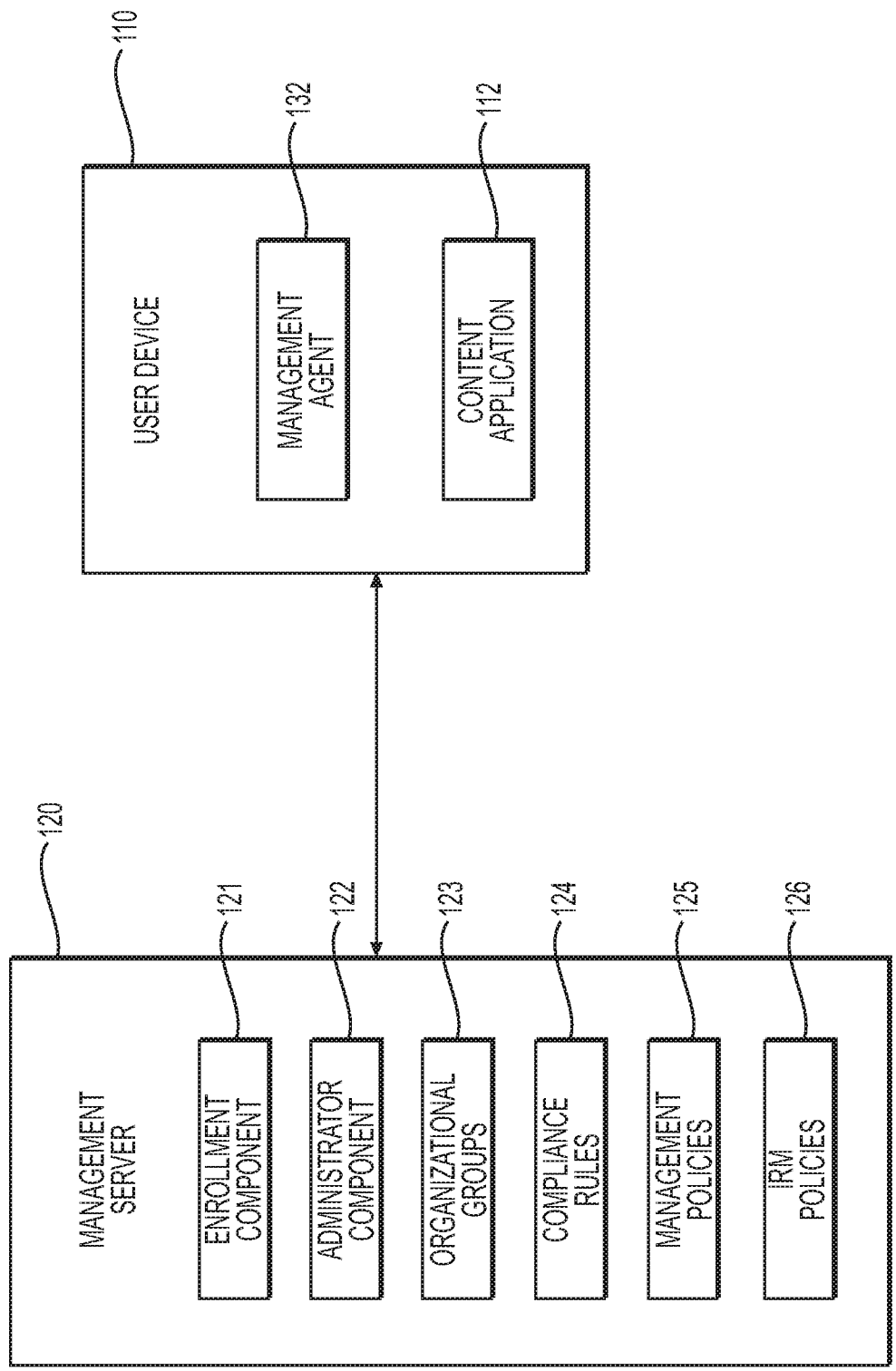
FIG. 1 is an illustration of example system components for dynamically applying information rights management policies to documents.

Turning to FIG. 1, a management server 120 and user device 110 are shown. A user device 110 can include any computing device, such as a cell phone, laptop, tablet, personal computer, or workstation. A user device 110 can include a non-transitory computer-readable medium containing instructions that are executed by a processor. Example non-transitory, computer-readable mediums include RAM and ROM, disks, and other memory and storage that is accessible by a USB port, a floppy drive, CD-ROM, or DVD-ROM drive, and a flash drive, among others. Furthermore, the terms "user device" and "user devices" are used interchangeably, as appropriate.

The user device 110 can enroll with the management server 120—for example, as part of an overall EMM or Mobile Device Management ("MDM") system. The management server 120 can include multiple servers, processors, and computing devices. In some examples, the management server 120 is a network of servers, some of which can be located remotely from one another. In another example, the management server 120 is a single server with multiple purposes. In yet another example, the management server 120 is a server (or group of servers) dedicated to the operations described herein. A system administrator can have privileges associated with managing, editing, revising, and otherwise administrating functions associated with the management server 120.

The management server 120 can monitor and manage the operation of user devices 110, through the management server 120 itself, or more specifically, through a management service or program executing on the management server 120. Although one user device 110 is shown, the management server 120 can monitor and manage the operation of multiple user devices 110 enrolled in a device management service. The management server 120 can also provide access to email, calendar data, contact information, and other enterprise resources to enrolled user devices 110.

The management server 120 can include an enrollment component 121 and an administrator component 122, which can both be used for the process of enrolling user device 110. For example, a user device 110 can communicate with the enrollment component 121 during the initial stages of enrollment. In some examples, the enrollment component 121 can provide a token to the user device 110 indicating that the user device 110 has been authenticated and is permitted to communicate and enroll with the management server 120. The management server 120 or enrollment component 121 can provide the user device 110 with information regarding how to access and communicate with the administrator component 122 in order to continue the enrollment process.

In some examples, the administrator component 122 can request a token from the user device 110, indicating that the user device 110 has been authenticated and is permitted to continue the enrollment process with the administrator component 122. Upon receiving the token, the administrator component 122 can continue the enrollment process. The administrator component 122 can also provide a console for an administrator to configure and monitor the status of the user device 120 and the enrollment process. In some examples, the administrator component 122 can be dedicated to a particular enterprise or group of enterprises, while the enrollment component 121 can be shared across multiple different enterprises.

Management server 120 can include one or more organizational groups 123. An organizational group 123 can include data representing a group of user devices 110 managed by the management server 120. An organizational group 123 can correspond to a structure or hierarchy of a business or enterprise. For example, an enterprise can have various groups such as an engineering team, an accounting team, and a marketing team. Each of these teams can correspond to an organizational group 123 stored on the management server 120.

In addition to corresponding to a business team, an organizational group 123 can correspond to user devices 110 positioned in a particular geographic location. For example, a business can have different business locations, such as a public waiting room, private conference room, a laboratory, office space, and a parking garage. In this example, separate organizational groups 123 can be established for each of the public waiting room, private conference room, laboratory, office space, and parking garage. User devices 110 positioned in one of these locations can be included in the respective organizational group 123.

The management server 120 can also include compliance rules 124. A compliance rule 124 can set forth one or more conditions that must be satisfied in order for a user device 110 to be deemed compliant. If compliance is broken, the management server 120 can take steps to control access of the user device 110 to enterprise files and email. Compliance rules can be assigned differently to the different organizational groups 123. For example, a developer group can be assigned different compliance rules 124 than an executive group. The executive group might be allowed to install different applications than the development group. Similarly, the management server 120 can assign different compliance rules 124 based on the different location-based organizational groups 123.

The determination of whether a user device 110 is compliant can be made by the management server 120, the user device 110, or a combination of both. For example, the management agent 132 on the user device 110 can generate a data object that describes the state of the user device 110, including any settings, parameters, applications, or other information regarding the state of the user device 110. The data object can be analyzed by the management server 120 or the user device 110 to determine whether the user device 110 is in compliance with compliance rules 124. In the case of the user device 110 analyzing compliance, a management agent 132 installed on the user device 110 can make the comparison between the data object and compliance rules 124.

In some examples, a compliance rule 124 can specify one or more triggering conditions. If a triggering conditions occurs, the system can react accordingly. For example, the management server 120 can automatically perform one or more remedial actions. In another example, the management server 120 can prompt an administrator to take one or more remedial actions. In some cases, remedial actions can be staged, such that the user of a user device 110 is provided with a chance to remedy their noncompliance before being subjected to stricter remedial actions. Various triggering conditions and their accompanying potential remedial actions are described in more detail below. Detailed examples of compliance rules 124, and their operation in conjunction with the management server 120, user device 110, and management agent 132, are included after the discussion of FIGS. 1-4.

The management server 120 can also include management policies 125 that direct the management of a user device 110. For example, a management policy 125 can specify which resources can be made available to a user device 110 from the management server 120. This can include, for example, specifying that the management server 120 is permitted to provide an e-mail service to the user device 110.

In some examples, the management policies 125 can specify the compliance rules 124 with which a user device 110 is required to comply. A compliance rule 124 can be assigned to one or more management policies 125. In some examples, a compliance rule 124 can be assigned to a particular organizational group 123. The management policy 125 can specify how the user devices 110 associated with that organizational group 123 are to be managed. For example, the management policy 125 can specify certain activities or functions that are required from, or prohibited by, user devices 110 associated with a particular organizational group 123.

The management agent 132 can be a portion of an operating system for the user device 110, or it can operate in the application layer of the user device 110. For example, the management agent 132 can be a dedicated application or other software installed on the user device 110 that can monitor and manage data, software components, and hardware components associated with the user device 110. The management agent 132 can monitor and control functionality and other managed applications on the user device 110. The management agent 132 can also determine whether a compliance rule 124 is, or has been, satisfied by the user device 110.

In some examples, the management agent 132 can parse a data object describing the state of the user device 110, including various settings of the user device 110 as well as actions it has taken. Based on the data object, the management agent 132 can determine whether various compliance rules 124 have been satisfied. In some examples, the management agent 132 can communicate with the management server 120 to determine whether the compliance rules 124 are satisfied by the user device 110. For example, the management agent 132 can cause the data object to be transmitted to the management server 120 to facilitate that determination.

The management agent 132 can be an application, or portion of an application, that provides functionality beyond simply monitoring and managing resources in the user device 110. In one example, the management server 120 can provide a SDK that a developer can use to insert, for example, security libraries into the application. In another example, a developer can incorporate libraries and other components through a process of "wrapping." To wrap an application, a developer can decompile the application, insert the libraries or other components, and then recompile the application. When a library is incorporated into an application, the functionality provided by the library can be called by the management agent 132 executing in a user device 110. For example, if a security library provides the ability to monitor and enable or disable functionality provided by an application, the management agent 132 can call functions provided by the library to monitor and enable or disable the functionality.

A management policy 125 can specify that a user device 110 has permission to perform or access certain functionality by virtue of that user device 110 being associated with an organizational group 123. For example, a management policy 125 can be created without reference to a particular user device 110. Instead, the management policy 125 can be associated with an organizational group 123. The organizational group 123 can change over time and include different user devices 110 over time. But because the management policy 125 is associated with the organizational group 123 rather than the any particular user device 110, the management policy 125 can apply to all user devices 110 within the organizational group 123 at any given time.

In one example, a user device 110 can become a member of, or become associated with, an organizational group 123 when an administrator specifies that the user device 110 should be a member. In another example, a user device 110 becomes associated with an organizational group 123 when a membership condition is satisfied, such as through a dynamic evaluation of the membership condition. A membership condition can be created by an administrator 110 by specifying a condition relating to the user device 110 that, when satisfied, causes the user device 110 to be associated with the organizational group 123. Similarly, the membership condition can be created such that when a condition relating to the user device 110 is met (or not met), the user device 110 is removed from the organizational group 123.

Alternatively, a user device 110 can become disassociated with an organizational group 123 based on the user of the user device 110. For example, an administrator 110 or dynamic evaluation can identify an individual for additional to, or removal from, an organizational group 123. If the user operates multiple user devices 110, all of the user's user devices 110 can be added to, or removed from, the organizational group 123 of interest. In this way, all of the user's user devices 110 can be made subject to a uniform set of management policies 125 and compliance rules 124.

As shown in FIG. 1, the management server 120 can also contain IRM policies 126. IRM policies 126 can set forth rules for applying IRM to documents based on any number of different factors. An enterprise administrator can establish, modify, or removed IRM policies 126. An IRM policy 126 can apply broadly to all documents within an enterprise's control, or can apply more specifically. For example, an IRM policy 126 can apply to a particular user, geographic location, or organizational group 123. IRM policies 126 can also apply based on the content of the documents themselves. For example, an IRM policy 126 can specify that documents containing trade secrets—defined as the appearance of particular words or phrases—should have IRM applied that only permits viewing by top-level managers or executives, and prevents printing, exporting, or extracting. As another example, an IRM policy 126 can specify that if a user is not compliant with a particular compliance rule 124, then when that user attempts to retrieve a file from a repository, the file can be wrapped with IRM that prevents the user from viewing, editing, printing, or otherwise accessing the file.

Also shown in FIG. 1 is a content application 112 installed on the user device 110. The content application 112 can be any application that allows viewing, editing, exporting, extracting, printing, or commenting on documents. Common examples include, but are not limited to, MICROSOFT WORD, EXCEL, OUTLOOK, LOTUS WORD PRO, APPLE PAGES, APACHE OPENOFFICE WRITER, POLARIS OFFICE, and many more.

In some examples, the management server 120 can provide instructions to the user device 110 to install the content application 112 on the user device 110. The instructions can include, for example, a command sent to the management agent 132 installed on the user device. In some examples, a compliance rule 124 can be enforced that requires the user device 110 to execute the content application 112.

FIG. 2 provides an illustration of example system components for dynamically applying IRM policies to documents. FIG. 2 includes a user device 110, such as a managed user device 110 that is enrolled with the management server 120 in the manner described with respect to FIG. 1. In the example of FIG. 2, a user can request a secure document that is stored in a document repository 150. The document repository 150 can be a database, a group of databases, a server, a group of servers, or any other type of storage device. The requested document can be a native file without any IRM protection, or a document that already has some form of IRM protection.

When the user requests the document, the user device 110 can send a request message to a secure access point. In the example of FIG. 2, the secure access point is a proxy server 130. The proxy server 130 can include multiple server, processors, and computing devices. In one example, the proxy server 130 is an AIRWATCH CONTENT GATEWAY. The proxy server 130 can receive requests for documents in the document repository 150, request the document from the repository 150, receive the document from the repository 150, and then send the document to another location or device. In FIG. 2, the proxy server 130 receives the document request from the user device 110 through the Internet 160. However, the proxy server 130 can also receive a document request through a cellular network, LAN, or any other type of network. In another example, the proxy server 130 is an AIRWATCH MOBILE ACCESS GATEWAY, which can proxy all data transmissions between the user device 110 to the Internet 160 and can identify document requests by analyzing the data being proxied.

After receiving the request from the user device 110, the proxy server 130 can retrieve the requested document from the document repository 150. During the process of retrieving a document from the document repository 150, or after receiving the document at the proxy server 130, an IRM engine 140 can intercept the document and perform various actions. In one example, the proxy server 130 is part of a content gateway through which requested content passes. The proxy server 130 can intercept the content and send it to the IRM engine 140. The IRM engine 140 can dynamically wrap the content with one or more IRM policies.

The IRM engine 140 can be a process executing on the proxy server 130, the management server 120, a standalone server, or any other device. The IRM engine 140 can be a managed device that is enrolled with the management server 120, in some examples. The IRM engine 140 can detect, or be informed of, a document pulled from the repository 150 by the proxy server 130. The IRM engine 140 can then determine the appropriate IRM protection for the document, determine any current IRM protection, and modify the document accordingly.

The IRM engine 140 can access a variety of information sources to determine the precise type of IRM that should be applied to the document. For example, the IRM engine 140 can apply IRM policies 126 set at the management server 120. The IRM engine 140 can also parse the document, and metadata associated with the document, to make determinations. The IRM engine 140 can also access information from the management server 120, such as organization groups 123, compliance status of the user device 110, management policies 125 associated with the user device, and any other relevant information. Furthermore, the IRM engine 140 can access information at the management server 120 regarding the user device 110, such as its current geographic location, the content application 112 requesting the document, or other content applications 112 on the user device 110 that might attempt to access the document.

Based on the information available to it, the IRM engine 140 can apply IRM policies 126 to dynamically determine the appropriate IRM to apply to the document. In one example, the IRM engine 140 applies IRM to the document based on the type of content application 112 on the user device 110. For example, if the user is requesting to view the document in MICROSOFT WORD, then the IRM engine 140 can utilize a MICROSOFT SDK to wrap the document with MICROSOFT-compatible IRM. Alternatively, the IRM engine 140 can utilize multiple SDK's to wrap the document with multiple types, or layers, of IRM such that the document is compatible with more than one RMS. In some examples, the IRM engine 140 can selectively provide, or not provide, compatibility with a particular RMS as a result of a compliance determination. For example, a compliance rule 124 can specify that the user device 110 needs to have the most recent version of a content application 112. If the user device 110 is out of compliance on that point, the IRM engine 140 can selectively wrap the document with IRM other than an IRM compatible with the content application 112. This can be used as a mechanism to incentivize a user to remain complaint.

In another example, the IRM engine 140 can determine an appropriate IRM policy based on an organizational group 123 of the user requesting the document. For example, the user can belong to an executive organizational group 123 and an accounting organizational group 123. If the document contains information that is confidential but generally available to members of the executive group 123, the IRM engine 140 can wrap the document with IRM that allows the user to view, print, and export the document, but not extract or edit the document, according to an IRM policy 126. However, if that user requests a highly confidential legal document unrelated to either the executive or accounting groups 123, the IRM engine 140 can wrap the document such that the user is allowed to view, but not save, extract, print, comment, or edit the document.

In another example, the IRM engine 140 can select IRM based on the creator of the document and any stored relationships or dependencies between the creator and the requesting user. For example, if the document creator and the requesting user work in the same department and commonly share documents, then the IRM engine 140 can wrap the document such that the requesting user has full access to modify the document as desired.

In yet another example, the IRM engine 140 can select IRM based on the content of the document itself. For example, the IRM engine 140 can parse text included in the document and compare the parsed text to a database of terms. In some examples, an IRM policy 126 can specify that the presence of certain terms trigger a particular IRM restriction, such as not being able to edit the document. The IRM policy 126 could further specify that the specified term would need to occur a predetermined number of times before triggering the restriction.

The examples provided above are merely exemplary. The IRM engine 140 can access any information made available to it by the management server 120, user device 110, proxy server 130, and the content of the document itself. The IRM engine 140 can utilize IRM policies 126 to determine an appropriate action to take based on the information available to it. In some cases, the IRM engine 140 can use one or more algorithms to analyze the available information and make decisions regarding an appropriate IRM package to apply.

To apply IRM to a document, the IRM engine 140 can use one or more SDK's to wrap the document with IRM protection, which restricts access to the document to applications configured to remove or unlock the IRM protection. In one example, this includes encrypting the document. The encrypted document can then require one or more keys to decrypt the document, portions of the document, or functionality associated with the document.

In one example, applying IRM to a document can include including specific restrictions or policies in the header of the file. When the user attempts to access the file, an RMS service can enforce the restrictions or policies provided in the header of the file. The management server 120, proxy server 130, or IRM engine 140 can provide information to the RMS service regarding enforcing those restrictions and policies. Similarly, if IRM policies 126 on the management server 120 change after the document has been wrapped, the management server 120 can notify the RMS service of the modified policies 126 to be enforced as a result of particular IRM protections. To ensure that a documents are up to date, the user can be required to log in to the RMS service at least once during a specified period of time—for example, at least once every three days. Otherwise, opening the document can prompt a user for credentials, thereby accessing the RMS service and allowing the RMS service to modify permissions for the document, if necessary.

In one example, applying an IRM policy can include specifying a policy in the header of the document, where the policy is enforced by a third party. For example, a third party IRM service can be responsible for providing the actual enforcement rules for a document. In one example, the management server 130 can update the dynamically applied IRM policy by contacting a third-party IRM server to change the rules associated with an applied policy. For example, the management server 120 can contact MICROSOFT through an SDK to change a security template for an IRM policy. When a user accesses a document that is already wrapped in an IRM policy, the document can get the new restrictions from MICROSOFT as directed.

In another example, applying IRM to a document can include identifying a reference, such as the management server 120, in the header of the document, rather than including the specific restrictions in the header of the document. The management server 120 can store the restrictions and cause the user to access the management server 120 when accessing the file. By causing the user to route through the management server 120 to obtain access, the management server 120 can track various types of information associated with the document and the user.

For example, the management server 120 can recognize and track any actions the user attempts to carry out with respect to the document, including sending, exporting, extracting, printing, commenting, editing, and viewing. The management server 120 can also track unsuccessful actions, such as attempting to view a document without permission, even though the document does not open for viewing.

The tracking of the user actions with respect to documents can be compared against compliance rules 124 to ensure that a user is performing a job function. For example, a compliance rule 124 can be set so that the user must open a threshold percentage of documents tagged with the user as a recipient. A process at the management server 120 can periodically calculate the percentage of those documents opened by the user based on checking usage history of each document with the tag.

In one example, a document can be wrapped in IRM for different IRM-enabled productivity. However, if an application is not compatible with an IRM policy, the management server 120 can be configured to not provide the document to the user device 110. This can force the user device 110 to use an IRM policy in compliance with enterprise practices. In another example, IRM policies applied to a document can conflict. In that example, the management server 120 can dictate that the stricter of the conflicting IRM policies be applied.

FIG. 3 provides a flowchart for an example system that dynamically applies IRM policies to documents. At stage 310, a user device 110 sends a request to an endpoint—in this example, a proxy server 130—requesting a particular document. This stage can occur when a user attempts to download a document on the user device 110, for example. The request can be delivered through a secure firewall in one example.

At stage 320, the proxy server 130 sends a request to retrieve the document from the document repository 150. The request can include information identifying the requested document, such as a hash value or encrypted hash, along with any credentials required by the document repository 150. The document repository 150 can locate the document based on the identifying information and attempt to deliver the document to the proxy server 130.

At stage 330, the document repository 150 sends the document, which is intercepted by the IRM engine 140. The term "intercepted" is not intended to be limiting; for example, the document repository 150 can intentionally send the document directly to the IRM engine 140 in some examples. In other examples, the document is sent from the document repository 150 to the proxy server 130, which then delivers the document to the IRM engine 140.

At stage 340, the IRM engine 140 applies IRM to the document. As part of this stages, the IRM engine 140 can access various sources of information to determine the IRM that should be applied. For example, the IRM engine 140 can access information stored on the management server 120, proxy server 130, or information associated with the document itself. The IRM engine 140 can apply IRM policies 126 set at the management server 120. In a scenario where the requested document already has IRM protection, the IRM engine 140 can compare the current IRM protection to the desire IRM protection specified by relevant IRM policies 126, and if the IRM policies 126 require any additional protections, the IRM engine 140 can apply those additional protections to the document.

After applying the appropriate IRM to the document, the IRM engine 140 can send the protected document to the proxy server 130 at stage 350. The file extension of the protected document can be modified to indicate that the document is protected. For example, a "p" can be added at the beginning of the file extension, such that a document with a ".doc" extension becomes ".pdoc," a document with a ".pdf" extension becomes ".ppdf," and so on.

At stage 360, the proxy server 130 can deliver the protected document to the user device 110. This can include, for example, delivering the document through a management agent 132 installed on the user device 110. The protected document can be delivered through a cloud-based distribution system, in one example. The document can also be delivered through a LAN or by using a physical storage device.

FIG. 4 provides a flowchart for an example method of dynamically applying IRM policies to documents. Stage 410 of the method can include receiving, at a proxy server 130, a request from a user to retrieve a document stored at a document repository 150. This stage can occur when a user attempts to download a document on the user device 110, for example. The proxy server 130 can receive the request through a cloud-based network accessed remotely by the user device 110.

Stage 420 can include retrieving the requested document from the document repository 150. This stage can be initiated by the proxy server 130 providing a request to the document repository 150 that includes identifying information for the requested document. The document repository 150 can utilize the identifying information to retrieve the document. In this stage, "retrieving the document" can include receiving the requested document at the proxy server 130, or alternatively, can include causing the proxy server 130 to send the requested document to the IRM engine 140.

In either case, at stage 430, the requested document can be provided to a dynamic IRM wrapping service, such as the IRM engine 140 discussed above. In some examples, the document repository 150 attempts to send the requested document to the proxy server 130, and the IRM engine 140 intercepts the document. In other examples, the document repository 150 sends the requested document directly to the proxy server 130.

Stage 440 can include applying, by the dynamic IRM wrapping service, at least one IRM policy to the document. For example, the IRM engine 140 can modify the header of the document file to include one or more IRM policies 126 or restrictions. The IRM policies 126 or restrictions can be determined by the IRM engine 140 based on information made available by the management server 120, proxy server 130, or information associated with the document itself. The IRM engine 140 can apply IRM policies 126 set at the management server 120. In a scenario where the requested document already has IRM protection, the IRM engine 140 can compare the current IRM protection to the desire IRM protection specified by relevant IRM policies 126, and if the IRM policies 126 require any additional protections, the IRM engine 140 can apply those additional protections to the document.

Stage 450 can include sending the IRM-protected document to the requesting user from the proxy server 130. This stage can also include sending the document from the IRM engine 140 to the proxy server 130, which then sends the document to the user device 110. This can include, for example, delivering the document from the proxy server 130 to a management agent 132 installed on the user device 110.

Compliance Rules Examples

In one example, a compliance rule 124 requires that the operating system of the user device 110 not be modified, such as being "rooted" or "jailbroken." In that example, the triggering condition for the compliance rule 124 is a determination that the operating system of the user device 110 is modified. The management server 120 can make this determination by analyzing a data object generated by the management agent 132 on the user device 110. If the triggering condition exists, then multiple remedial actions can be taken: (1) the management server 120 can notify the user that their user device 110 is noncompliant, and optionally provide a timeframe indicating when further remedial action will be taken; (2) the management server 120 can provide an "enterprise wipe" of the user device 110, which can include uninstalling the management agent 132 and any enterprise-related applications or other information from the user device 110; (3) the management server 120 can lock or block certain services or functionality on the user device 110—for example, by uninstalling a profile or token on the device that allows access to those services of functionality, by instructing the relevant gateway or server to block traffic from the device, or by instructing remote services to stop serving the device; (4) the management server 120 can initiate a full device wipe, which can include removing all enterprise and personal data from the user device 110; and (5) the management server 120 can un-enroll the user device 110, either by removing the management agent 132 from the user device 110 or by deleting the relevant device record from the management server 120.

In another example, a compliance rule 124 can specify particular applications that are not authorized to be installed on the user device 110. This can be useful for preventing blacklisted or malicious applications from being installed on the user device 110. The management server 120 can make this determination by analyzing a data object generated by the management agent 132 on the user device 110. If this compliance rule 124 is broken, then several remedial actions can be taken: (1) the management server 120 can notify the user that their user device 110 is noncompliant, identify a compliant version of the unauthorized application, if one exists, and optionally provide a timeframe indicating when further remedial action will be taken; (2) the management server 120 can remove the noncompliant application from the user device 110, using the management agent 132 for example; (3) the management server 120 can install a compliant version of the application on the user device 110, using the management agent 132 from example; and (4) the management server 120 can execute an enterprise wipe of the user device 110, uninstalling the management agent 132 and any enterprise-related applications or other information from the user device 110.

In yet another example, a compliance rule 124 can require that an MDM profile or management agent application ("agent") be currently installed and operational on the user device 110. The MDM profile or agent can correspond to the management agent 132 of FIG. 1, or portions thereof. The MDM profile can be a data object including information regarding the user and user device 110, such as enterprise privileges, access to various applications and functionalities, device type, organizational groups 123, and other information. If the management server 120 determines that compliance is broken because the MDM profile or agent are removed from the device, then several remedial actions can be taken: (1) the management server 120 can notify the user that their user device 110 is noncompliant, and optionally provide information regarding re-enrollment; (2) if no management software remains on the user device 110, the management server 120 can notify the user that their user device 110 has been un-enrolled; (3) if the MDM profile remains installed on the user device 110 but the agent is removed, the management server 120 can cause the user device 110 to reinstall the agent (for example, by reinstalling management agent 132); and (4) the management server 120 can execute an enterprise wipe of the user device 110, uninstalling the management agent 132 and any enterprise-related applications or other information from the user device 110.

In another example, a compliance rule 124 can specify that an MDM container be currently installed and operational on the user device 110. An MDM container can be any application, or group of applications, that is "containerized" on the user device 110 by segregating data associated with the applications in the container from those outside the container. The containerized data can be encrypted to provide additional security. An MDM container can be a single containerized application, such as an e-mail container, a content container, a browsing container, or an application container for secure applications. In some examples, an MDM container can include a group of applications, such as email, content, and browsing applications, within a single encrypted container.

If the management server 120 determines that an MDM container required by a compliance rule 124 has been removed from the user device 110, remedial actions can be taken: (1) the management server 120 can notify the user that their user device 110 is noncompliant, and can provide instructions for reinstalling the removed MDM container; (2) if no management software remains on the user device 110, the management server 120 can notify the user that their user device 110 has been un-enrolled; and (3) the management server 120 can cause the user device 110 to reinstall the MDM container.

In another example, a compliance rule 124 can specify that a particular application profile or service profile be currently installed and operational on the user device 110. An application profile can include settings for applications, such as "wrapped" applications that include a security layer around the application. The compliance rule 124 can specify that particular settings associated with the application profile are prohibited. For example, the compliance rule 124 can require device-wide settings, such as preventing cloud backup or external storage or requiring connecting through a tunnel or Virtual Private Network (VPN); browser settings, such as requiring an HTTPS connection or blocking certain web sites; and other security settings, such as preventing copying and pasting, requiring credentials for certain actions, and specifying authorized virtual machines that can be utilized by the device.

Similarly, a service profile can include settings for particular services associated with the user device 110. Example settings associated with a service profile can include disk encryption settings, VPN settings, e-mail settings, cellular data settings, WIFI settings, BLUETOOTH settings, tethering settings, and firewall settings. If any of these settings are changed in a manner contrary to the compliance rule 124, the management server 120 can determine that device compliance is broken.

If device compliance is broken with respect to either an application profile or service profile, as explained above, a variety of options are available: (1) the management server 120 can cause the user device 110 to reinstall a profile with the required settings, or otherwise revert the settings as appropriate; (2) the management server 120 can notify the user that their user device 110 is noncompliant; (3) the management server 120 can execute an enterprise wipe of the user device 110, uninstalling the management agent 132 and any enterprise-related applications or other information from the user device 110; (4) the management server 120 can block certain remote services by, for example, uninstalling profiles on the user device 110 that allow the device to access to the remote services, instructing a gateway service to block traffic to or from the user device 110, or instructing the remote services to stop serving the user device 110; (5) the management server 120 can initiate a full device wipe, which can include removing all enterprise and personal data from the user device 110; and (6) the management server 120 can un-enroll the user device 110, either by removing the management agent 132 from the user device 110 or by deleting the relevant device record from the management server 120.

In yet another example, a compliance rule 124 can require valid credentials from the user, such as a valid, unexpired certificate on the user device 110. If compliance is broken with respect to the device credentials, several options are available: (1) the user device 110 can be permitted a threshold number of authentication attempts; (2) the user device 110 can be locked; (3) the management server 120 can block certain remote services by, for example, uninstalling profiles on the user device 110 that allow the device to access to the remote services, instructing a gateway service to block traffic to or from the user device 110, or instructing the remote services to stop serving the user device 110; (4) the management server 120 can execute an enterprise wipe of the user device 110, uninstalling the management agent 132 and any enterprise-related applications or other information from the user device 110; (5) the management server 120 can initiate a full device wipe, which can include removing all enterprise and personal data from the user device 110; and (6) the management server 120 can un-enroll the user device 110, either by removing the management agent 132 from the user device 110 or by deleting the relevant device record from the management server 120.

In a related example, a compliance rule 124 can require that user-created credentials meet certain security requirements. For example, the compliance rule 124 can require that user-created credentials include a threshold number of characters, not include the user's name, not match a previous password, or be reset after a certain period of time. If compliance is broken with respect to any aspects of the user-created credentials, several options are available: (1) the management server 120 can notify the user that their user device 110 is noncompliant, and optionally provide a timeframe indicating when further remedial action will be taken; (2) the user device 110 can be locked; (3) the management server 120 can block certain remote services by, for example, uninstalling profiles on the user device 110 that allow the device to access to the remote services, instructing a gateway service to block traffic to or from the user device 110, or instructing the remote services to stop serving the user device 110; (4) the management server 120 can execute an enterprise wipe of the user device 110, uninstalling the management agent 132 and any enterprise-related applications or other information from the user device 110; (5) the management server 120 can initiate a full device wipe, which can include removing all enterprise and personal data from the user device 110; and (6) the management server 120 can un-enroll the user device 110, either by removing the management agent 132 from the user device 110 or by deleting the relevant device record from the management server 120.

In another example, a compliance rule 124 can specify that compliance is contingent a time or location aspect associated with the user device 110. For example, a compliance rule 124 can specify that a request for access to a remote server is only compliant when made within a certain timeframe, or while the user device 110 is located within a particular geographical location. If compliance is broken with respect to the time or geographic requirements, several options are available: (1) the management server 120 can block certain remote services by, for example, uninstalling profiles on the user device 110 that allow the device to access to the remote services, instructing a gateway service to block traffic to or from the user device 110, or instructing the remote services to stop serving the user device 110; (2) the management server 120 can notify the user that their user device 110 is noncompliant, and optionally provide a timeframe indicating when further remedial action will be taken; and (3) the user device 110 can be locked.

In yet another example, a compliance rule 124 can specify certain types of communication channels for the user device 110 in particular situations. For example, compliance can be broken if the user device 110 uses an unsecure communication channel to access a service that requires a secure communication channel. Additionally, compliance can be broken if the user device 110 activates cellular roaming when it is prohibited, or uses cellular service when WIFI is required. If compliance is broken, a number of remedial options are available: (1) the management server 120 can notify the user that their user device 110 is noncompliant, and optionally provide a timeframe indicating when further remedial action will be taken; (2) the management server 120 can block certain remote services by, for example, uninstalling profiles on the user device 110 that allow the device to access to the remote services, instructing a gateway service to block traffic to or from the user device 110, or instructing the remote services to stop serving the user device 110; (3) the management server 120 can execute an enterprise wipe of the user device 110, uninstalling the management agent 132 and any enterprise-related applications or other information from the user device 110; (4) the management server 120 can initiate a full device wipe, which can include removing all enterprise and personal data from the user device 110; and (5) the management server 120 can un-enroll the user device 110, either by removing the management agent 132 from the user device 110 or by deleting the relevant device record from the management server 120.

As part of the enrollment or management of a user device 110, an administrator 110 can create a device record for the user device 110. The device record can be stored on the management server 120, and can include data related to the management of the user device 110. For example, the device record can include data describing one or more of: the identity and type of the user device 110; components of the user device 110; the state of the user device 110; organizational groups 123 to which the user device 110 belongs; compliance rules 124 with which the user device 110 must comply; and management policies 125 that specify if, when, and how the user device 110 is permitted to function.

For example, data describing the identity and type of the user device 110, as well as the components of the user device 110, can include at least one or more of: a unique identifier associated with the user device 110; a device type of the user device 110 (e.g., a smartphone, a tablet computing, a laptop computer, a desktop computer, a server computer, or a virtualized instance of any of such computer types); and various software and hardware components of the user device 110 (e.g., operating system (or kernel or bios) type and version, processor type and speed, memory type and size, network interface types, various I/O component types such as camera, touchscreen, keyboard, mouse, printer).

With respect to data describing the state of the user device 110, such data can include can specify, for instance, various settings that are applied to the user device 110, various applications that are installed on or being executed by the user device 110, and various files that are installed on or are accessible to the user device 110. Additionally, the data describing the state of the user device 110 can specify information related to the management of the user device 110, such as the last time the user device 110 provided data describing its state to the management server 120. The data can also describe whether the user device 110 is in a state of compliance with any applicable compliance rules 124, and whether any remedial actions have been (or are to be) taken as a result of a noncompliance with any applicable compliance rules 124.

The data describing organizational groups 123 to which the user device 110 belongs can, for example, include any organizational groups 123 of which the user device 110 is a member, either by virtue of a hard-coded relationship between the user device 110 and the organizational group 123, or by virtue of a dynamic evaluation of a membership condition associated with the organizational group 123.

The data describing compliance rules 124 with which the user device 110 must comply can, for instance, specify one or more remedial actions that should be performed in the event that an associated rule condition occurs. Data describing management policies 125 can include permissions of the user device 110, such as access rights, and settings that are being enforced upon the user device 110. In some examples, the data describing compliance rules 124 and the data describing management policies 125 can be obtained from an organizational record associated with an organizational group 123 to which the user device 110 is a member.

In some examples, an administrator 110 can manually input data into the administrator component 122 in order to generate a device record for a user device 110. In other examples, the administrator component 122 can obtain a data object, such as an electronic spreadsheet, extensible markup language ("XML") file, or comma separated values ("CSV") file. The administrator component 122 can extract information describing the user device 110 from the data object to create a corresponding device record. The device record for each user device 110 can include information identifying each user device 110 and its respective device record.

In some examples, after the administrator component 122 creates a device record for a user device 110, the management server 120 can detect whether the user device 110 is enrolled. For example, the management server 120 can determine whether a flag is set, indicating that the user device 110 is enrolled.

If the user device 110 is not yet enrolled, the management server 120 can automatically transmit information identifying the user device 110 to the enrollment component 121. For example, the user device 110 can transmit a device identifier, such as its media access control ("MAC") address, to the enrollment component 121. In some examples, when the enrollment component 121 receives the device identifier, the enrollment component 121 can determine whether a corresponding device record exists. If there is no corresponding device record, the enrollment component 121 can determine that the user device 110 is not authorized to enroll.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The orders of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A system for dynamically applying information rights management (IRM) policies to documents, comprising:
   a document repository that stores documents, wherein the document repository comprises at least one of a database and a storage server;
   a proxy server that receives a request from a user device for a document stored on the document repository and retrieves the requested document from the document repository; and a dynamic IRM wrapping service that executes on at least one of the proxy server and the user device, wherein the dynamic IRM wrapping service at least:
  intercepts the document retrieved by the proxy server,
  accesses content information from the document and document information for the document from the proxy server and at least one of the user device and a management service,
  implements at least one algorithm to perform an analysis of at least one of the content information and the document information, and
  applies at least one IRM policy to the document based on the analysis and contextual information associated with the request including a relationship between the user and a creator of the document, wherein the relationship includes both the user and the creator belonging to a same organizational group, and wherein applying the at least one IRM policy includes locating a server that provides an enforcement rule by using information in a header of the document, and
wherein after the dynamic IRM wrapping service applies the at least one IRM policy to the document, the proxy server sends the IRM-protected document to the requesting user.

2. The system of claim 1, wherein the contextual information associated with the request further comprises at least one of: a status of the user making the request, an organizational group associated with the user making the request, a compliance status of a device making the request on behalf of the user, and a geographic location of the user making the request.

3. The system of claim 1, wherein the dynamic IRM wrapping service applies the at least one IRM policy based, at least in part, on contextual information associated with the document included in the document information.

4. The system of claim 3, wherein the content information includes text or images contained within the document, and wherein contextual information associated with the document comprises at least one of a storage location of the document and existing IRM protection associated with the document.

5. The system of claim 1, wherein the dynamic IRM wrapping service applies the at least one IRM policy to the document based on a management policy set by an administrator.

6. The system of claim 1, wherein the at least one IRM policy is compatible with a rights management service (RMS) provided by at least one of MICROSOFT, ORACLE, DELL, or a combination thereof.

7. A method for dynamically applying information rights management (IRM) policies to documents, comprising:
  receiving, at a proxy server, a request from a user to retrieve a document stored on a document repository;
  retrieving the document from the document repository;
  providing the document to a dynamic IRM wrapping service;
  accessing, by the dynamic IRM wrapping service, content information from the document and document information for the document from the proxy server and at least one of the user device and a management service;
  implementing, by the dynamic IRM wrapping service, at least one algorithm to perform an analysis of at least one of the content information and the document information;
  applying, by the dynamic IRM wrapping service, at least one IRM policy to the document based on the analysis and contextual information associated with the request including a relationship between the user and a creator of the document, wherein the relationship includes both the user and the creator belonging to a same organizational group, and wherein applying the at least one IRM policy includes locating a server that provides an enforcement rule by using information in a header of the document; and
  sending the IRM-protected document to the requesting user from the proxy server.

8. The method of claim 7, wherein the contextual information associated with the request further comprises at least one of: a status of the user making the request, an organizational group associated with the user making the request, a compliance status of a device making the request on behalf of the user, and a geographic location of the user making the request.

9. The method of claim 8, wherein the dynamic IRM wrapping service applies the at least one IRM policy based, at least in part, on contextual information associated with the document.

10. The method of claim 9, wherein the content information includes text or images contained within the document, and wherein the contextual information associated with the document comprises at least one of a storage location of the document and existing IRM protection associated with the document.

11. The method of claim 8, wherein the dynamic IRM wrapping service applies the at least one IRM policy to the document based on a management policy set by an administrator.

12. The method of claim 8, wherein the at least one IRM policy is compatible with a rights management service (RMS) provided by at least one of MICROSOFT, ORACLE, DELL, or a combination thereof.

13. A non-transitory, computer-readable medium comprising instructions that, when executed by a processor, causes the processor to carry out stages for dynamically applying information rights management (IRM) policies to documents, the stages comprising:
  receiving, at a proxy server, a request from a user to retrieve a document stored on a document repository;
  retrieving the document from the document repository;
  providing the document to a dynamic IRM wrapping service;
  accessing, by the dynamic IRM wrapping service, content information from the document and document information for the document from the proxy server and at least one of the user device and a management service;
  implementing, by the dynamic IRM wrapping service, at least one algorithm to perform an analysis of at least one of the content information and the document information;
  applying, by the dynamic IRM wrapping service, at least one IRM policy to the document based on the analysis and contextual information associated with the request including a relationship between the user and a creator of the document, wherein the relationship includes both the user and the creator belonging to a same organizational group, and wherein applying the at least one IRM policy includes locating a server that provides an enforcement rule by using information in a header of the document; and
  sending the IRM-protected document to the requesting user from the proxy server.

14. The non-transitory, computer-readable medium of claim 13, wherein the contextual information associated with the request further comprises at least one of: a status of the user making the request, an organizational group associated with the user making the request, a compliance status of a device making the request on behalf of the user, and a geographic location of the user making the request.

15. The non-transitory, computer-readable medium of claim 13, wherein the dynamic IRM wrapping service applies the at least one IRM policy based, at least in part, on contextual information associated with the document included in the document information.

16. The non-transitory, computer-readable medium of claim 15, wherein the content information includes text or images contained within the document, and wherein contextual information associated with the document comprises at least one of a storage location of the document and existing IRM protection associated with the document.

17. The non-transitory, computer-readable medium of claim 15, wherein the dynamic IRM wrapping service applies the at least one IRM policy to the document based on a management policy set by an administrator.

* * * * *